No. 857,854. PATENTED JUNE 25, 1907.
J. K. WOOLCOTT.
DRAFT EQUALIZER.
APPLICATION FILED AUG. 2, 1906.

WITNESSES:
E. K. Stewart
Hubert D. Lawson

James K. Woolcott, INVENTOR
By C. A. Snow & Co.
ATTORNEYS

THE NORRIS PETERS CO., WASHINGTON, D. C.

UNITED STATES PATENT OFFICE.

JAMES K. WOOLCOTT, OF ALCESTER, SOUTH DAKOTA.

DRAFT-EQUALIZER.

No. 857,854.  Specification of Letters Patent.  Patented June 25, 1907.

Application filed August 2, 1906. Serial No. 328,920.

*To all whom it may concern:*

Be it known that I, JAMES K. WOOLCOTT, a citizen of the United States, residing at Alcester, in the county of Union and State of South Dakota, have invented a new and useful Draft-Equalizer, of which the following is a specification.

This invention relates to draft equalizers and its object is to provide a simple and inexpensive device of this character which is especially designed for use with four draft animals.

The invention consists of a draw bar to which are pivoted arms extending rearwardly from an equalizer bar. The ends of this equalizer bar are connected by pivoted links with angular or bell crank levers fulcrumed upon the draw bar and to the ends of which the draft animals are adapted to be fastened.

The invention also consists of certain other novel features of construction and combinations of parts which will be hereinafter more fully described and pointed out in the claims.

In the accompanying drawings is shown the preferred form of the invention.

Figure 1:
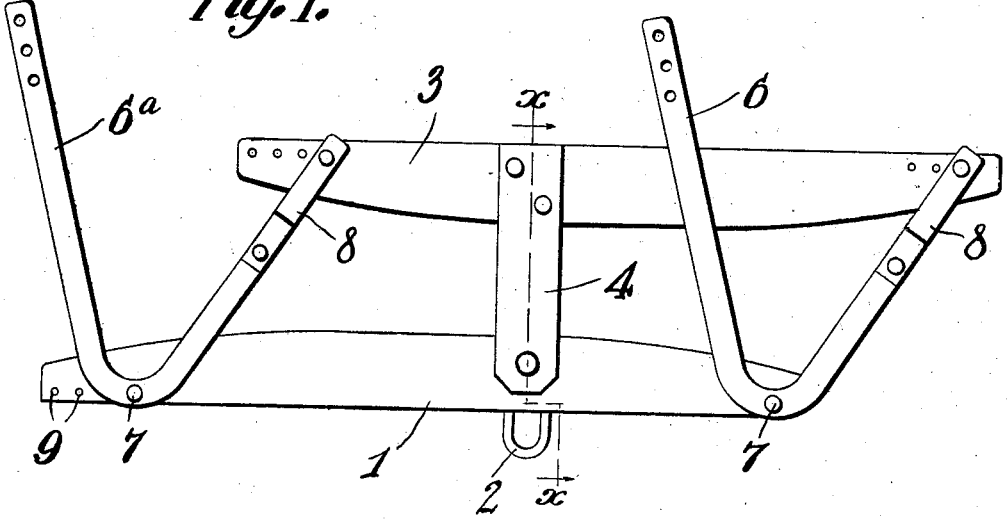
Figure 2:
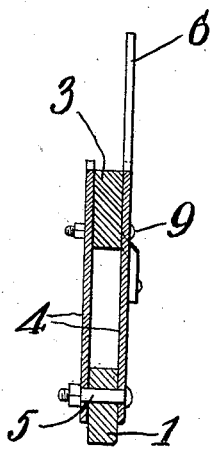

In said drawings: Figure 1 is a plan view; and Fig. 2 is a central transverse section.

Referring to the figures by characters of reference, 1 is a draw bar of any preferred proportions and having an eye 2 adapted to be engaged by a suitable clevis not shown whereby the same may be secured to the agricultural implement or machine to be operated. An equalizer bar 3 is disposed in front of the draw bar and has rearwardly extending parallel arms 4 bolted or otherwise rigidly secured thereto at a point removed from the center thereof and these arms embrace the draw bar at a point adjacent one end of the bar and are pivoted thereto as shown at 5 and directly in front of the eye 2. Similar angular or bell crank levers 6 and 6ª are pivoted at their elbows as at 7 to the end portions of the draw bar. One end of each of these levers projects beyond the equalizer bar and the other ends of the levers are pivoted to links 8 which are in turn pivoted to the end portions of the equalizer bar. A series of openings 9 is formed in one end of the draw bar so that the pivot bolt of the bell crank lever 6ª can be placed in any one of them so as to regulate the leverage. The same provision is made for connecting the link of the same bell crank lever to the equalizer bar.

In using this equalizer one of the draft animals is harnessed to the front end of the lever 6ª while a three-horse equalizer, which is not shown, is connected to the forward end of the lever 6. Any forward pull upon the lever 6ª will cause the forward movement of the long end of the draw bar and the backward movement of the opposite end thereof. This pull, however, will be offset by the pull exerted by the three horses upon the short end of the draw bar. The angular levers 6 and 6ª will cause the equalizer bar 3 to rock upon its pivot 5 so that the pressure will be equally distributed among the horses.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. In a draft equalizer the combination with a draw bar and an equalizer bar pivotally connected at a point removed from its center to one end portion of the draw bar; of angular levers fulcrumed adjacent the ends of the draw bar and extending beyond the equalizer bar, and pivotal connections between said levers and the ends of the equalizer bar.

2. A draft equalizer comprising a draw bar, means removed from the center thereof for connecting it to an object to be moved, bell crank levers fulcrumed adjacent the ends of the draw bar, an equalizer bar, an arm extending rearwardly therefrom at a point removed from its center, said arm being pivoted to the draw bar adjacent the connecting means thereon, and links pivoted to the ends of the equalizer bar and levers, said levers projecting beyond the equalizer bar.

3. A draft equalizer comprising a draw bar, an equalizer bar disposed in front thereof, an arm extending from one end portion of the equalizer bar and pivoted to the opposite end portion of the draw bar, a bell crank lever adjustably pivoted to one end portion of the draw bar, a link pivoted to said lever and adjustably pivoted to one end portion of the equalizer bar, a bell crank lever pivoted to the other end portion of the draw bar, and a link connection between said lever and the
5 adjoining end portion of the equalizer bar, said levers extending beyond the equalizer bar.

In testimony that I claim the foregoing as my own, I have hereto affixed my signature in the presence of two witnesses.

JAMES K. WOOLCOTT.

Witnesses:
WILLIE SCHNOSE,
JOHN G. C. HUBBARD.